(12) United States Patent
Coudert et al.

(10) Patent No.: US 12,394,334 B2
(45) Date of Patent: Aug. 19, 2025

(54) DELIVERY OF ARTIFICIAL INTELLIGENCE BASED CONTEXT-SENSITIVE LANGUAGE ASSISTANCE TO WIRELESS COMMUNICATION DEVICES

(71) Applicant: T-Mobile Innovations LLC, Overland Park, KS (US)

(72) Inventors: Oliver Coudert, Arlington, VA (US); Mark Holland, Reston, VA (US); Durga Prasad Satapathy, Ashburn, VA (US); Bharatwajan Raman, Arlington, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 666 days.

(21) Appl. No.: 17/865,354

(22) Filed: Jul. 14, 2022

(65) Prior Publication Data

US 2024/0021102 A1    Jan. 18, 2024

(51) Int. Cl.
    *G09B 21/00*    (2006.01)
    *G06F 3/023*    (2006.01)

(52) U.S. Cl.
    CPC ......... *G09B 21/009* (2013.01); *G06F 3/0238* (2013.01)

(58) Field of Classification Search
    None
    See application file for complete search history.

(56) References Cited

U.S. PATENT DOCUMENTS

2022/0327294 A1 * 10/2022 Dhawan .................. G10L 15/16

* cited by examiner

*Primary Examiner* — James B Hull

(57) ABSTRACT

A wireless communication device is disclosed that includes a non-transitory memory, a processor, and a local agent. The local agent transmits context information to an AI engine and receives and stores sign language data sets selected based on the context information from the AI engine in the non-transitory memory. The local agent receives content in need of language assistance. In response to a determination to process the content locally, the local agent converts the content into first sign language gestures based on the data sets. In response to a determination to process the content remotely, the local agent sends at least some of the content to the AI engine, receives keys from the AI engine, and determines second sign language gestures based on the keys and the data sets. The local agent sends the first or second sign language gestures to a display of the wireless communication device for presentation.

20 Claims, 9 Drawing Sheets

DELIVERY OF ARTIFICIAL INTELLIGENCE BASED CONTEXT-SENSITIVE LANGUAGE ASSISTANCE TO WIRELESS COMMUNICATION DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some individuals have communication disabilities. A communication disability affects a person's ability to understand and/or be understood by others. One such communication disability is hearing loss, impairment, or deafness. Individuals with a communication disability often need communication assistance.

SUMMARY

In an embodiment, a wireless communication device is disclosed. The wireless communication device comprises a non-transitory memory comprising a subset of a plurality of sign language data sets and a processor. The wireless communication device also comprises a local agent stored in the non-transitory memory that, when executed by the processor, transmits context information associated with the wireless communication device to an AI engine on a computer system and receives and stores the subset of the plurality of sign language data sets from the AI engine in the non-transitory memory of the wireless communication device. The subset of the plurality of sign language data sets is selected based on the context information. The subset of the plurality of sign language data sets comprises a mapping of keys to sign language gestures. The local agent also receives content in need of language assistance and determines whether to process the content locally or remotely based on at least one of network conditions or wireless communication device conditions. In response to a determination to process the content locally, the local agent converts the content into a first set of sign language gestures based on the subset of the plurality of sign language data sets. In response to a determination to process the content remotely, the local agent sends at least some of the content to the AI engine, receives a plurality of keys from the AI engine, and determines a second set of sign language gestures based on the plurality of keys and the mapping included in the subset of the plurality of sign language data sets. The local agent additionally sends the first set of sign language gestures or the second set of sign language gestures to a display of the wireless communication device, wherein the first set of sign language gestures or the second set of sign language gestures is presented on the display.

In another embodiment, a method for delivery of artificial intelligence (AI) based context-sensitive language assistance is disclosed. The method comprises transmitting, by a local agent on a wireless communication device, context information associated with the wireless communication device to an AI engine on a computer system and receiving and storing, by the local agent, a subset of a plurality of sign language data sets from the AI engine in a non-transitory memory of the wireless communication device. The subset of the plurality of sign language data sets is selected based on the context information. The method also comprises receiving, by the local agent, first content in need of language assistance, converting, by the local agent, the first content into a first set of sign language gestures based on the subset of the plurality of sign language data sets, and displaying the first set of sign language gestures via a display of the wireless communication device. The method additionally comprise transmitting, by the local agent, updated context information associated with the wireless communication device to the AI engine and receiving and storing, by the local agent, a different subset of the plurality of sign language sets from the AI engine in the non-transitory memory. The different subset of the plurality of sign language data sets is selected based on the updated context information. The method further comprises receiving, by the local agent, second content in need of language assistance, converting, by the local agent, the second content into a second set of sign language gestures based on the different subset of the plurality of sign language data sets, and displaying the second set of sign language gestures via the display of the wireless communication device.

In yet another embodiment, a system for delivery of artificial intelligence (AI) based context-sensitive language assistance is disclosed. The system comprise a computer system that comprises a non-transitory memory and a processor. The computer system also comprise an AI engine stored in the non-transitory memory that, when executed by the processor, receives context information from a wireless communication device, determines a subset of a plurality of sign language data sets based on the context information from the wireless communication device, and sends the subset of the plurality of sign language data sets to the wireless communication device. The subset of the plurality of sign language data sets comprises a mapping of keys to sign language gestures. The AI engine also receives content in need of language assistance from the wireless communication device, determines a plurality of keys based on the content and the context information, and sends the plurality of keys to the wireless communication device. The system additionally comprises a local agent stored in a non-transitory memory of the wireless communication device that, when executed by a processor of the wireless communication device, receives and stores the subset of the plurality of sign language data sets from the AI engine in the non-transitory memory of the wireless communication device, receives the plurality of keys from the AI engine, determines a set of sign language gestures based on the plurality of keys and the mapping included in the subset of the plurality of sign language data sets, and sends the set of sign language gestures to the display of the wireless communication device for presentation to a user of the wireless communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
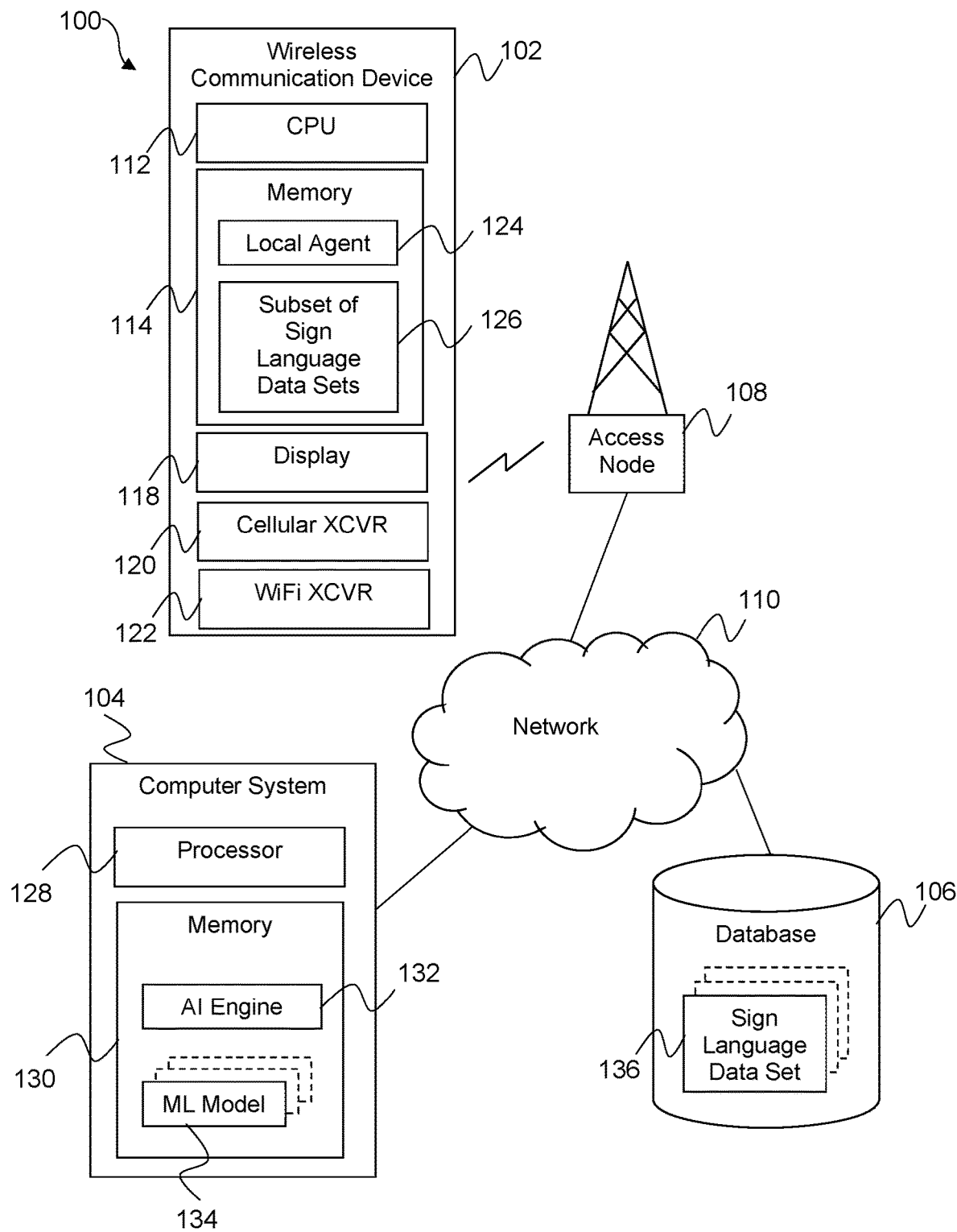
- FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Some individuals have communication disabilities, which may affect a person's ability to understand and/or be understood by others. One such communication disability is hearing loss, impairment, or deafness. Traditionally, communication assistance may be provided to a person with hearing loss, impairment, or deafness using a live stream of a remote interpreter. However, use of a live stream of a remote interpreter may be network resource intensive and require good network conditions.

The pending application is directed to delivery of artificial intelligence (AI) based context-sensitive language assistance to wireless communication devices. The disclosed system leverages context information from the wireless communication device requesting assistance and dynamically leverages the communication network depending on wireless communication device conditions and/or network conditions in order to deliver more focused and accurate language assistance in a more resource efficient and effective manner.

The system disclosed herein includes an AI engine on a computer system and a local agent on a wireless communication device. Depending on the wireless communication device conditions and/or the network conditions, which component (i.e., the local agent or the AI engine) is doing what processing may dynamically shift over time. For example, if connectivity is not an issue and/or when the wireless communication device has processing capability challenges, the AI engine may perform most of the processing. In contrast, if connectivity is an issue and/or when the wireless communication device has sufficient processing capability, the local agent may perform most of the processing. In either case, to help efficiently and effectively process the content in need of language assistance, the disclosed system may use context information from the wireless communication device to help minimize the amount of data to be searched for conversion. A simple non-limiting example of why context information matters is that "I want a dog" means one thing if you are at a pet store versus at a hot dog stand. The context information associated with the wireless communication device may come from audio, video, sensors, or other data and may comprise sensor information, a location of the wireless communication device, a time, a schedule, or other information. The context information may comprise current data associated with the wireless communication device and/or expected data associated with the wireless communication device.

The AI engine may receive the context information from the wireless communication device and apply machine learning (ML) models to determine a subset of sign language data sets to provide to the wireless communication device based on the context information. The AI engine may then send the subset of sign language data sets to the wireless communication device. Mobile edge computing may be used to dynamically provide context relevant sign language data sets to the wireless communication device as context information changes for the wireless communication device.

When the local agent receives content in need of communication assistance, the local agent may determine whether to process the content locally or remotely based on wireless communication device conditions and/or network conditions. The content in need of communication assistance may come from a waiter voice capture, a TSA agent, a teacher voice capture, a presentation audio/video, or a number of other different sources. If the content is to be processed locally, the local agent may convert the content into a set of sign language gestures based on the subset of sign language data sets. The set of sign language gestures may then be displayed on a display of the wireless communication device. The set of sign language gestures may comprise American sign language (ASL) or a different type of sign language. Since the subset of sign language data sets is already stored on the wireless communication device and filtered based on the context of the wireless communication device, less bandwidth is used because the network communication between the wireless communication device and the computer system is minimized. Further, there is more efficient processing on the wireless communication device because what is searched (i.e., a subset of sign language data sets as opposed to the totality of the sign language data subsets) is limited, and there is a more focused and likely more accurate language assistance provided to a user of the wireless communication device because only the context relevant subset of sign language data sets are stored on the wireless communication device and searched for the conversion.

If the content is to be processed remotely, the local agent may provide at least some of the content in need of language assistance to the AI engine. In some cases, additional or updated context information may be provided by the local agent to the AI agent. The AI engine may search a subset of the sign language data sets based on the context information associated with the wireless communication device. Similar to the local processing, searching by the AI engine of a context relevant subset of sign language data sets as opposed to the totality of sign language data sets promotes more effective and efficient processing.

The AI engine may determine a plurality of keys based on the content, the context information, and/or the searching of the context relevant subset of sign language data sets and send the keys to the local agent. The keys may drive the local agent to produce the sign language gestures. For example, the local agent may use the keys to determine a set of sign language gestures. For instance, the local agent may access a mapping of keys to sign language gestures stored in the wireless communication device. In some cases, this mapping may be provided by the subset of sign language data sets. The local agent may determine the set of sign language gestures based on the keys as well as instructions sent from the AI engine and/or consultation of the subset of sign language data sets stored on the wireless communication device. For instance, the sign language data sets may comprise a correlation between a key and a particular sign language gesture. The set of sign language gestures may then be displayed on a display of the wireless communication device. By providing the plurality of keys to the local agent rather than the sign language gestures themselves, bandwidth is conserved and latency may be reduced. Additionally, the processing burden of the wireless communication device is reduced as the local agent does not have to perform the full conversion of the content to the sign language gestures.

While the main use case for the disclosed system is with respect to a hearing communication disability, the disclosed system may be expanded to other types of communication disabilities such as blindness without departing from the spirit or scope of the disclosure. Additionally, the disclosed system may be expanded to the augmented reality (AR) space without departing from the spirit or scope of the disclosure.

Turning now to FIG. 1, a communication system 100 is described. In an embodiment, the system 100 comprises a wireless communication device 102, a computer system 104, a database 106, an access node 108, and a network 110. The wireless communication device 102 may comprise a processor 112, a non-transitory memory 114, a display 118, a cellular radio transceiver 120, and a WiFi radio transceiver 122. The wireless communication device 102 may be a mobile phone, a smart phone, a personal digital assistant (PDA), a wearable computer, a headset computer, a laptop computer, a notebook computer, or a tablet computer. The cellular radio transceiver 120 may be configured to establish a wireless communication link with access node 108 according to a 5G, a long-term evolution (LTE), a code division multiple access (CDMA), or a global system for mobile communication (GSM) telecommunication protocol. The access node 108 is able to communicatively couple the wireless communication device 102 to a network 110 and therethrough to other communication endpoints communicatively coupled to the network 110. The network 110 may comprise one or more public networks, one or more private networks, or a combination thereof.

The non-transitory memory 114 may comprise a local agent 124 and a subset of sign language data sets 126. The computer system 104 may comprise a processor 128 and a non-transitory memory 130. The non-transitory memory 130 of the computer system 104 may comprise an artificial intelligence (AI) engine 132, and one or more ML models 134. The computer system 104 be a general purpose computer described in more detail in regard to FIG. 3. The database 106 may store a plurality of sign language data sets 136. The plurality of sign language data sets 136 may comprise a plurality of data artifacts. Each data artifact may encode a sign or a gesture. For example, each data artifact may be an encoding of a graphical image or a sequence of images corresponding to one or more sign language gestures. The subset of sign language data sets 126 stored on the wireless communication device 102 are a subset of the plurality of sign language data sets 136 stored in the database 106.

The local agent 124 may transmit context information associated with the wireless communication device 102 to the AI engine 132 on the computer system 104. The context information may come from audio, video, sensors, or other data. In an embodiment, the context information comprises sensor information, a location of the wireless communication device 102, a time, a schedule, or other information. The context may be determined based on a location or by overhearing voices in audio or video content or by other inferences. Location may be determined by device self-location methods or by identifying WiFi stations and mapping a WiFi SSID to a known location. In an embodiment, the wireless communication device 102 presents a drop-down menu of contexts on the display 118, and the user selects one of the presented contexts to transmit to the AI engine 132. The contexts could be restaurant, grocery store, school, doctor's office, hardware store, hotel lobby, airport security checkpoint and/or boarding area, sporting event, or other contexts. The context information may comprise current data associated with the wireless communication device 102 and/or expected or forecasted data associated with the wireless communication device 102.

The AI engine 132 may determine, using at least one ML model 134, a subset of sign language data sets 126 for the wireless communication device 102 out of the plurality of sign language data sets 136 based on the context information and send the subset of sign language data sets 126 to the wireless communication device 102. In some cases, mobile edge computing may be used to dynamically provide context relevant sign language data sets to the wireless communication device 102 as context information changes for the wireless communication device 102. The local agent 124 may store the subset of sign language data sets 126 in the non-transitory memory 114.

The local agent 124 may receive content in need of language assistance. In some embodiments, the local agent 124 performs conversion of the content based on the subset of sign language data sets 126 and determines a set of sign language gestures using the subset of sign language data sets 126. The local agent 124 may perform the conversion itself in response to a determination to process the content locally because of network conditions and/or wireless communication device conditions. For example, the local agent 124 may determine to process the content locally if network connectivity is an issue and/or the local agent has enough processing capacity to perform the conversion. After the content is converted to the set of sign language gestures, the local agent 124 may provide the set of sign language gestures to the display 118. The display 118 may then present the set of sign language gestures to the user of the wireless communication device 102. The set of sign language gestures may comprise American Sign Language (ASL) or another type of sign language.

Since the subset of sign language data sets is already stored on the wireless communication device 102 and filtered based on the context of the wireless communication device 102, less bandwidth is used because the network communication between the wireless communication device and the computer system is minimized. Further, there is more efficient processing on the wireless communication device 102 because what is searched (i.e., the subset of sign language data sets 126 as opposed to the totality of the plurality of sign language data sets 136) is limited, and there is a more focused and likely more accurate language assistance provided to the user of the wireless communication device 102 because only the context relevant subset of sign language data sets 126 are stored on the wireless communication device 102 and searched for the conversion.

In an embodiment, rather than performing the conversion locally, the local agent 124 may send at least some of the content in need of language assistance to the AI engine 132. The local agent 124 may decide not to send all of the content based on network conditions. For example, in some situations, the local agent 124 may not send video content, but may only send audio content to conserve resources. The local agent 124 may send at least some of the content to the AI engine 132 in response to a determination to process the content remotely because of network conditions and/or wireless communication conditions. For example, the local agent 124 may determine to process the content remotely if connectivity is not an issue and/or when the wireless communication device has processing capability challenges. The AI engine 132 may determine, using at least one ML model 134, a subset of the plurality of sign language data sets 136 stored in the database 106 to search based on the context information associated with the wireless communication device 102. Similar to the local processing, searching by the AI engine 132 of a context relevant subset of the sign language data sets rather than all of the sign language data sets 136 promotes more effective and efficient processing.

The AI engine 132 may determine a plurality of keys based on the content, the context information, and/or the searching of the context relevant subset of the plurality of sign language data sets and send the keys to the local agent 124. In an embodiment, the keys drive the local agent 124 to produce sign language gestures. For example, the local agent 124 may use the keys to determine a set of sign language gestures. For instance, the local agent may access a mapping of keys to sign language gestures stored in the wireless communication device 102. In some cases, this mapping may be provided by the subset of sign language data sets 126. The local agent 124 may determine the set of sign language gestures based on the keys as well as instructions sent from the AI engine 132 and/or consultation of the subset of sign language data sets 126 stored on the wireless communication device 102. For example, the subset of sign language data sets 126 may comprise a correlation between a key and a particular sign language gesture.

The local agent 124 may provide the set of sign language gestures to the display 118. The display 118 may then present the set of sign language gestures to the user of the wireless communication device 102. A key may be a small data item (e.g., 2 bytes of data) while a gesture data artifact may be larger data item (e.g., 20,000 bytes of data). Thus, by providing the plurality of keys to the local agent 124 rather than the sign language gestures themselves, bandwidth is conserved and latency may be reduced. Additionally, the processing burden of the wireless communication device 102 is reduced as the local agent 124 does not have to perform the full conversion of the content to the sign language gestures.

As the context of the wireless communication device 102 changes, the local agent 124 may send updated context information to the AI engine 132. Updated context information may comprise an updated location, a changed application executing, a changed user selected context, a new or changed event added to a calendar, or another piece of updated context information. For example, the local agent 124 may send updated context information to the AI engine 132 periodically. In an embodiment, the AI engine 132 determines a different subset of sign language data sets for the wireless communication device 102 out of the plurality of sign language data sets 136 based on the updated context information and sends the different subset of sign language data sets to the wireless communication device 102. When content in need of language assistance is received by the local agent 124 after the context change, the different subset of sign language data sets may be used to produce a set of sign language gestures for the content. As network and/or device conditions change, the system 100 can dynamically adjust whether to process the content locally or remotely.

Figure 2A:
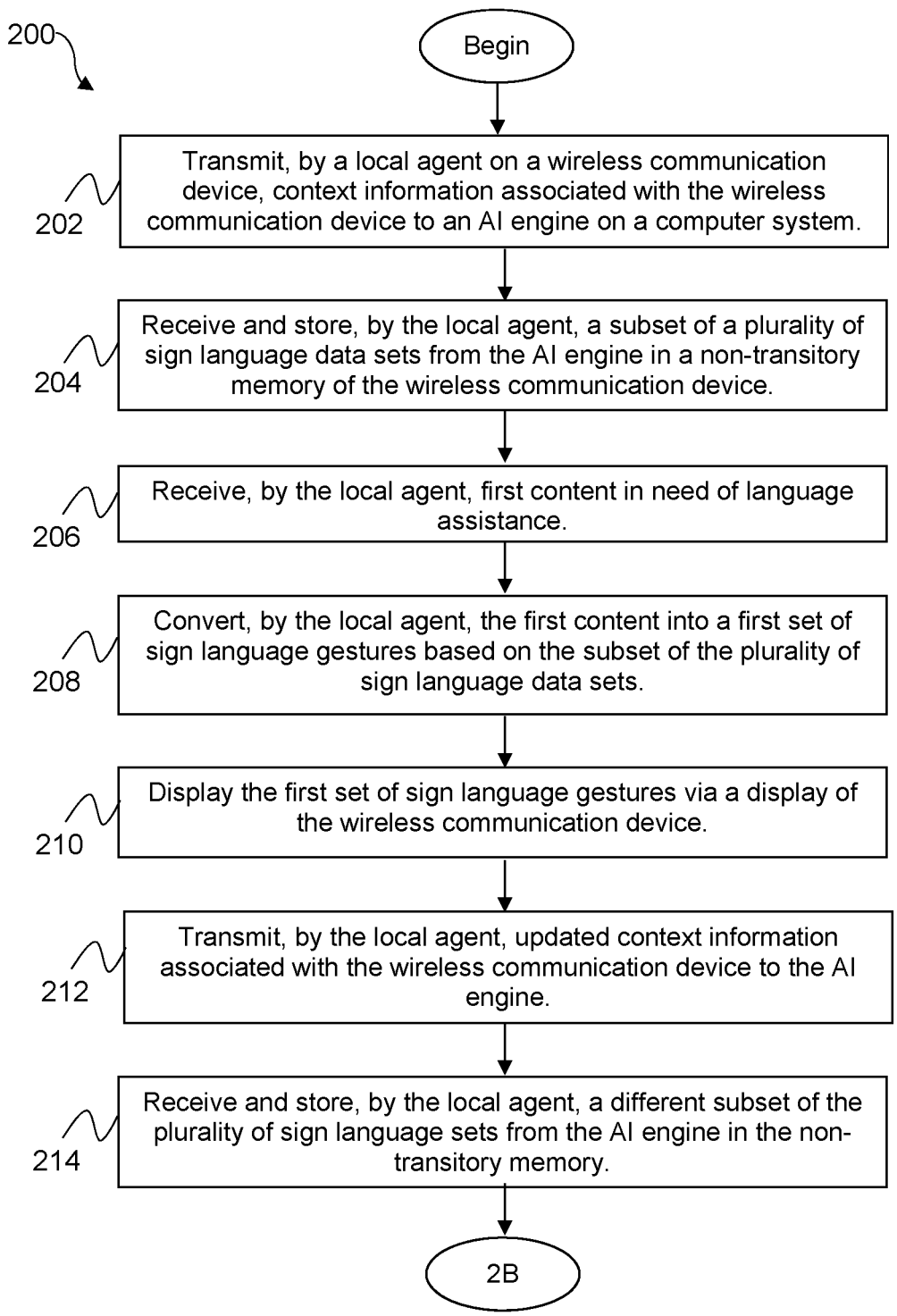
FIG. 2A and FIG. 2B are flow charts of a method according to an embodiment of the disclosure.
Figure 2B:
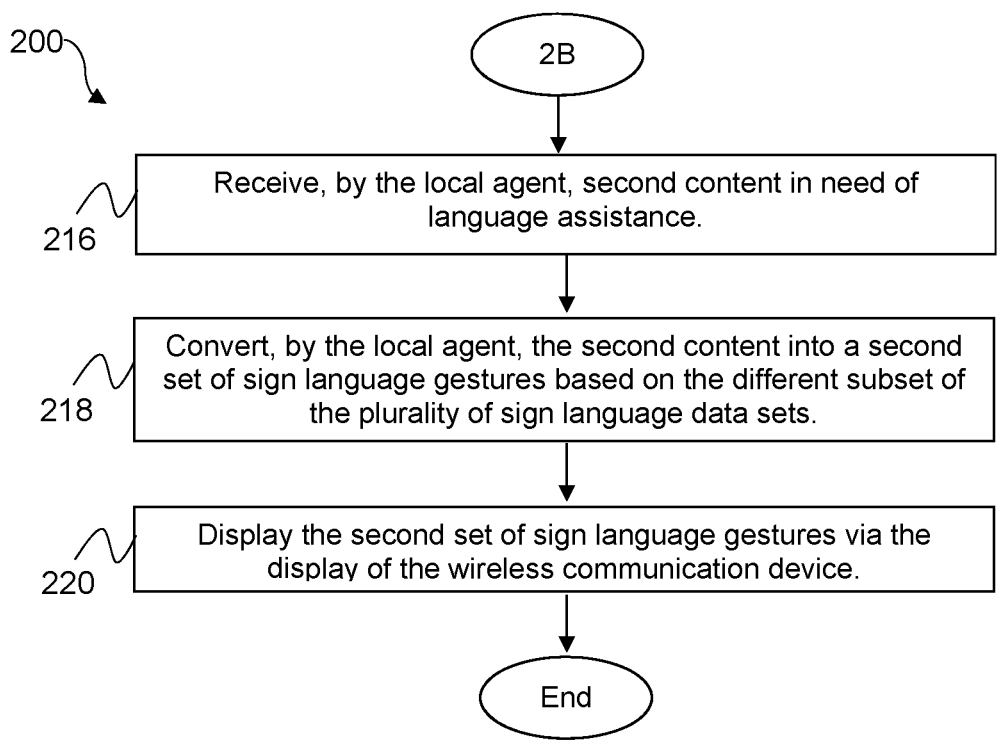

Turning now to FIG. 2A and FIG. 2B, a method 200 is described. In an embodiment, the method 200 is a method for delivery of AI based context-sensitive language assistance. At block 202, a local agent (e.g., local agent 124) on a wireless communication device (e.g., wireless communication device 102) transmits context information associated with the wireless communication device to an AI engine (e.g., AI engine 132) on a computer system (e.g., computer system 104). At block 204, the local agent receives and stores a subset (e.g. subset of sign language data sets 126) of a plurality of sign language data sets (e.g., a plurality of sign language data sets 136) from the AI engine in a non-transitory memory (e.g., non-transitory memory 114) of the wireless communication device. The subset of the plurality of sign language data sets are selected by the AI engine based on the context information. At block 206, the local agent receives first content in need of language assistance. At block 208, the local agent converts the first content into a first set of sign language gestures based on the subset of the plurality of sign language data sets. At block 210, the first set of sign language gestures is displayed via a display (e.g., display 118) of the wireless communication device.

At block 212, the local agent transmits updated context information associated with the wireless communication device to the AI engine. Updated context information may comprise an updated location, a changed application executing, a changed user selected context, a new or changed event added to a calendar, or another piece of updated context information. At block 214, the local agent receives and stores a different subset of the plurality of sign language data sets from the AI engine in the non-transitory memory. The different subset of the plurality of sign language data sets are selected by the AI engine based on the updated context information. At block 216, the local agent receives second content in need of language assistance. At block 218, the local agent converts the second content into a second set of sign language gestures based on the different subset of the plurality of sign language data sets. At block 220, the second set of sign language gestures is displayed via the display of the wireless communication device.

Figure 3:
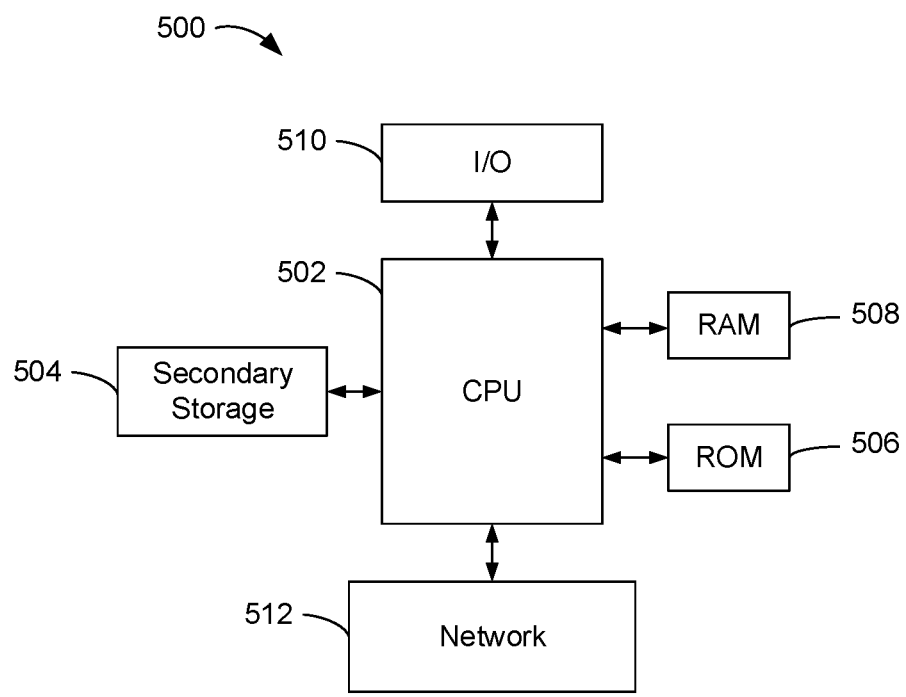
FIG. 3 is a block diagram of a computer system according to an embodiment of the disclosure.

FIG. 3 illustrates a computer system 500 suitable for implementing one or more embodiments disclosed herein. The computer system 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips.

It is understood that by programming and/or loading executable instructions onto the computer system 500, at least one of the CPU 502, the RAM 508, and the ROM 506 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 512 may provide wired communication links and/or wireless communication links (e.g., a first network connectivity device 512 may provide a wired communication link and a second network connectivity device 512 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID), The radio transceiver cards may promote radio communications using 5G, 5G New Radio, or 5G LTE radio communication protocols. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 502 executes instructions, codes, computer programs, scripts which it accesses from hard disk, floppy disk, optical disk (these various disk based systems may all be considered secondary storage 504), flash drive, ROM 506, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, for example, hard drives, floppy disks, optical disks, and/or other device, the ROM 506, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 504, to the ROM 506, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 504, to the ROM 506, to the RAM 508, and/or to other non-volatile memory and volatile memory of the computer system 500.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

Figure 4:
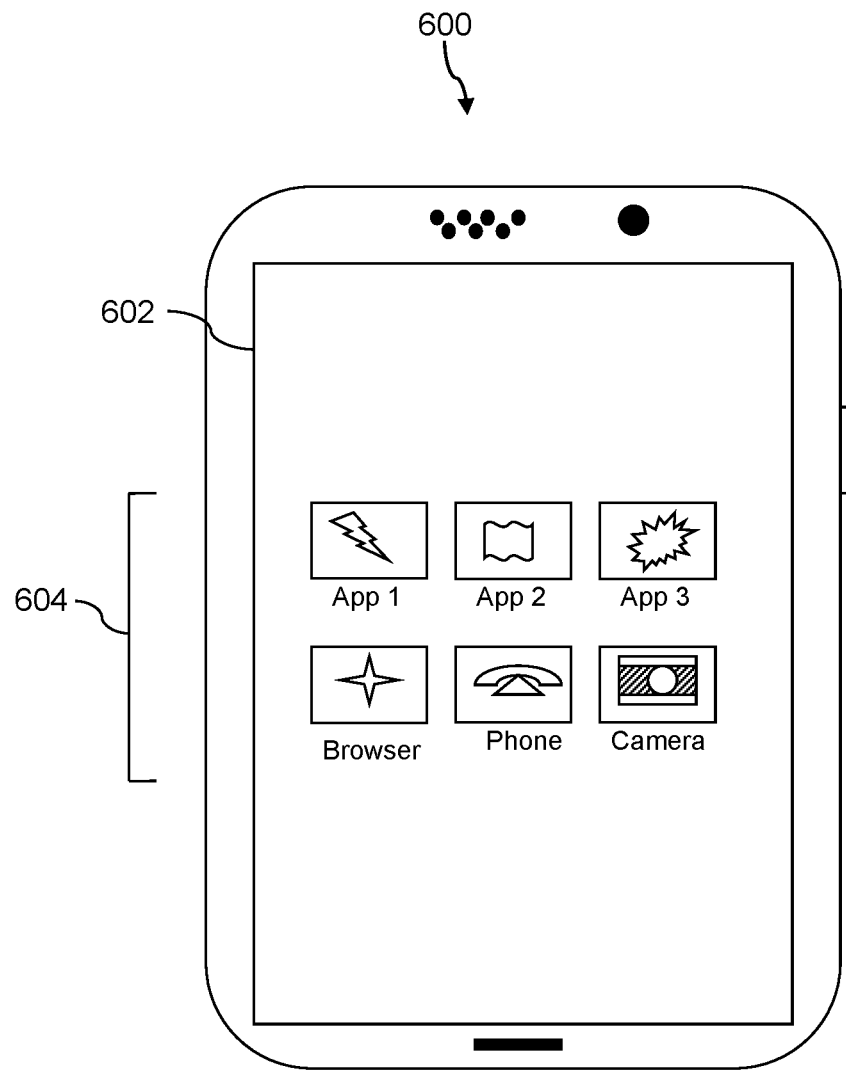
FIG. 4 is an illustration of a handset according to an embodiment of the disclosure.

FIG. 4 depicts the user equipment (UE) 600, which is operable for implementing aspects of the present disclosure, but the present disclosure should not be limited to these implementations. Though illustrated as a mobile phone, the UE 600 may take various forms including a wireless handset, a pager, a personal digital assistant (PDA), a gaming device, or a media player. The UE 600 includes a touchscreen display 602 having a touch-sensitive surface for input by a user. A small number of application icons 604 are illustrated within the touch screen display 602. It is understood that in different embodiments, any number of application icons 604 may be presented in the touch screen display 602. In some embodiments of the UE 600, a user may be able to download and install additional applications on the UE 600, and an icon associated with such downloaded and installed applications may be added to the touch screen display 602 or to an alternative screen. The UE 600 may have other components such as electro-mechanical switches, speakers, camera lenses, microphones, input and/or output connectors, and other components as are well known in the art. The UE 600 may present options for the user to select, controls for the user to actuate, and/or cursors or other indicators for the user to direct. The UE 600 may further accept data entry from the user, including numbers to dial or various parameter values for configuring the operation of the handset. The UE 600 may further execute one or more software or firmware applications in response to user commands. These applications may configure the UE 600 to perform various customized functions in response to user interaction. Additionally, the UE 600 may be programmed and/or configured over-the-air, for example from a wireless base station, a wireless access point, or a peer UE 600. The UE 600 may execute a web browser application which enables the touch screen display 602 to show a web page. The web page may be obtained via wireless communications with a base transceiver station, a wireless network access node, a peer UE 600 or any other wireless communication network or system.

Figure 5:
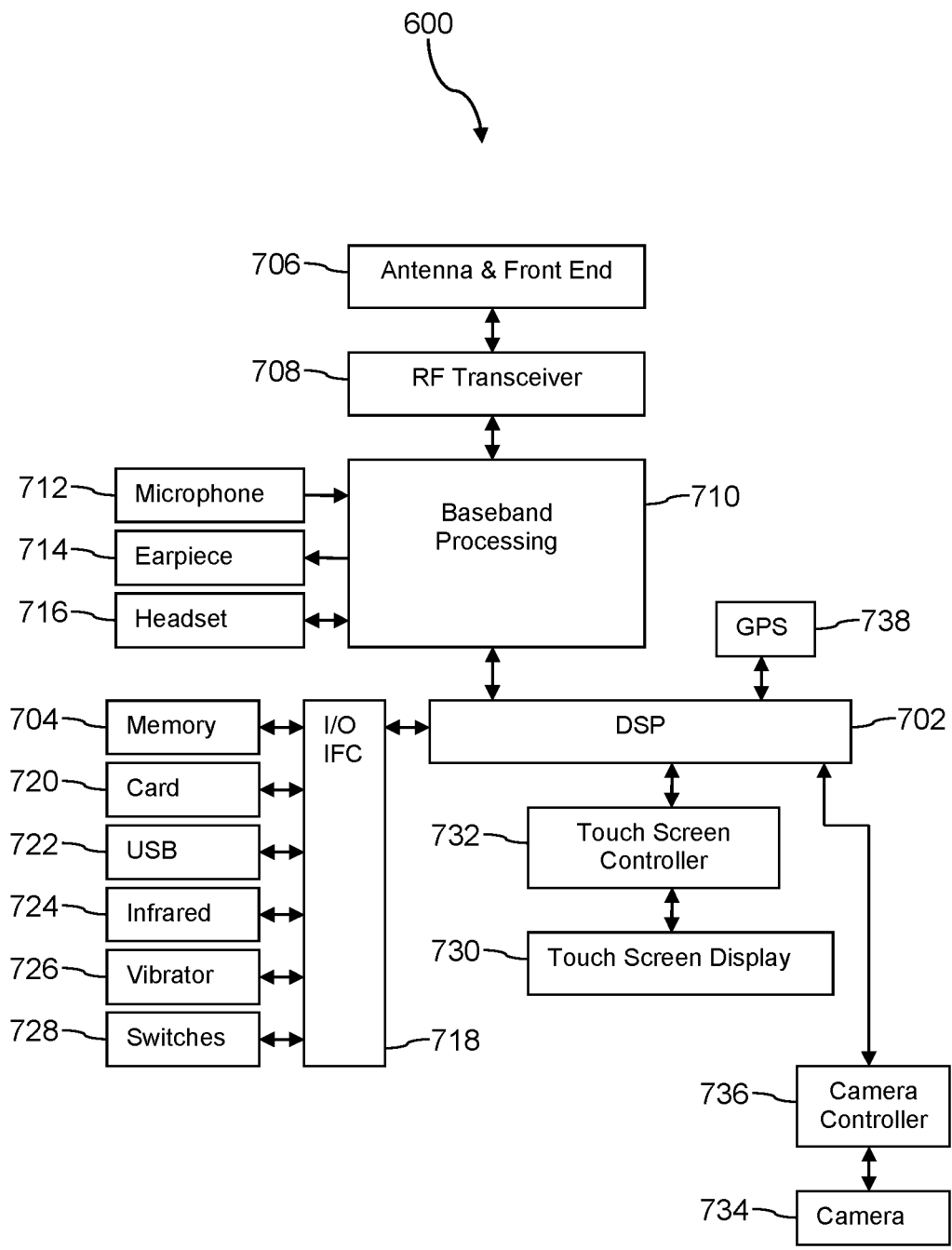
FIG. 5 is a block diagram of a hardware architecture for a user equipment (UE) according to an embodiment of the disclosure.

FIG. 5 shows a block diagram of the UE 600. While a variety of known components of handsets are depicted, in an embodiment a subset of the listed components and/or additional components not listed may be included in the UE 600. The UE 600 includes a digital signal processor (DSP) 702 and a memory 704. As shown, the UE 600 may further include one or more antenna and front end unit 706, a one or more radio frequency (RF) transceiver 708, a baseband processing unit 710, a microphone 712, an earpiece speaker 714, a headset port 716, an input/output interface 718, a removable memory card 720, a universal serial bus (USB) port 722, an infrared port 724, a vibrator 726, one or more electro-mechanical switches 728, a touch screen display 730, a touch screen controller 732, a camera 734, a camera controller 736, and a global positioning system (GPS) receiver 738. In an embodiment, the UE 600 may include another kind of display that does not provide a touch sensitive screen. In an embodiment, the UE 600 may include both the touch screen display 730 and additional display component that does not provide a touch sensitive screen. In an embodiment, the DSP 702 may communicate directly with the memory 704 without passing through the input/output interface 718. Additionally, in an embodiment, the UE 600 may comprise other peripheral devices that provide other functionality.

The DSP 702 or some other form of controller or central processing unit operates to control the various components of the UE 600 in accordance with embedded software or firmware stored in memory 704 or stored in memory contained within the DSP 702 itself. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB port 722 and the infrared port 724. The USB port 722 may enable the UE 600 to function as a peripheral device to exchange information with a personal computer or other computer system. The infrared port 724 and other optional ports such as a Bluetooth® interface or an IEEE 802.11 compliant wireless interface may enable the UE 600 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 708 may comprise a near field communication (NFC) transceiver. The NFC transceiver may be used to complete payment transactions with point-of-sale terminals or other communications exchanges. In an embodiment, each of the different radio transceivers 708 may be coupled to its own separate antenna. In an embodiment, the UE 600 may comprise a radio frequency identify (RFID) reader and/or writer device.

The switches 728 may couple to the DSP 702 via the input/output interface 718 to provide one mechanism for the user to provide input to the UE 600. Alternatively, one or more of the switches 728 may be coupled to a motherboard of the UE 600 and/or to components of the UE 600 via a different path (e.g., not via the input/output interface 718), for example coupled to a power control circuit (power button) of the UE 600. The touch screen display 730 is another input mechanism, which further displays text and/or graphics to the user. The touch screen LCD controller 732 couples the DSP 702 to the touch screen display 730. The GPS receiver 738 is coupled to the DSP 702 to decode global positioning system signals, thereby enabling the UE 600 to determine its position.

Figure 6A:
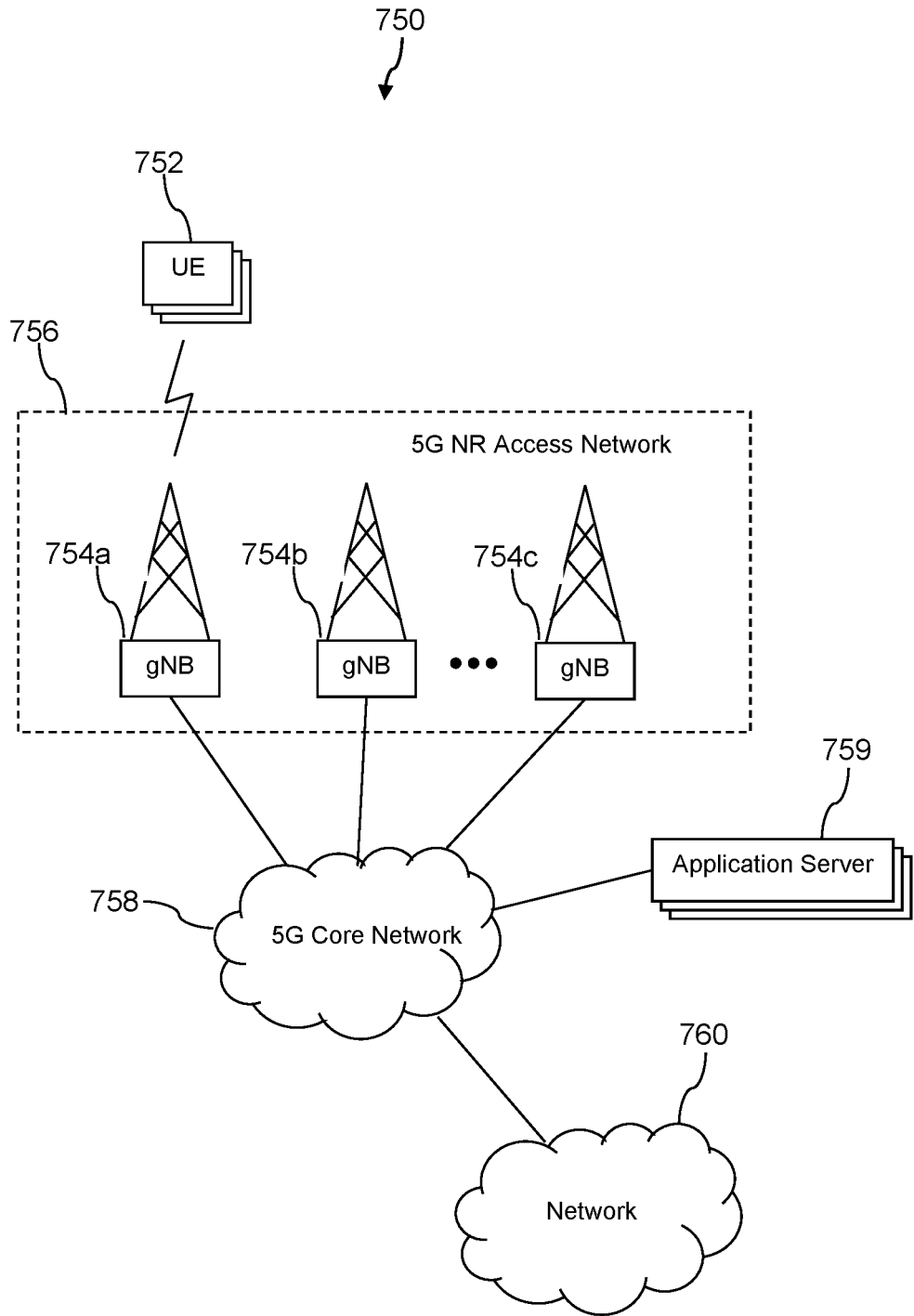
FIG. 6A and FIG. 6B are block diagrams of a 5G network architecture according to an embodiment of the disclosure.

Turning now to FIG. 6A, an exemplary communication system 750 is described. Typically, the communication system 750 includes a number of access nodes 754 that are configured to provide coverage in which UEs 752 such as cell phones, tablet computers, machine-type-communication devices, tracking devices, embedded wireless modules, and/or other wirelessly equipped communication devices (whether or not user operated), can operate. The access nodes 754 may be said to establish an access network 756. The access network 756 may be referred to as a radio access network (RAN) in some contexts. In a 5G technology generation an access node 754 may be referred to as a next Generation Node B (gNB). In 4G technology (e.g., long term evolution (LTE) technology) an access node 754 may be referred to as an evolved Node B (eNB). In 3G technology (e.g., code division multiple access (CDMA) and global system for mobile communication (GSM)) an access node 754 may be referred to as a base transceiver station (BTS) combined with a base station controller (BSC). In some contexts, the access node 754 may be referred to as a cell site or a cell tower. In some implementations, a picocell may provide some of the functionality of an access node 754, albeit with a constrained coverage area. Each of these different embodiments of an access node 754 may be considered to provide roughly similar functions in the different technology generations.

In an embodiment, the access network 756 comprises a first access node 754a, a second access node 754b, and a third access node 754c. It is understood that the access network 756 may include any number of access nodes 754. Further, each access node 754 could be coupled with a core network 758 that provides connectivity with various application servers 759 and/or a network 760. In an embodiment, at least some of the application servers 759 may be located close to the network edge (e.g., geographically close to the UE 752 and the end user) to deliver so-called "edge computing." The network 760 may be one or more private networks, one or more public networks, or a combination thereof. The network 760 may comprise the public switched telephone network (PSTN). The network 760 may comprise the Internet. With this arrangement, a UE 752 within coverage of the access network 756 could engage in air-interface communication with an access node 754 and could thereby communicate via the access node 754 with various application servers and other entities.

The communication system 750 could operate in accordance with a particular radio access technology (RAT), with communications from an access node 754 to UEs 752 defining a downlink or forward link and communications from the UEs 752 to the access node 754 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 754 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 754 could define an air interface configured in a specific manner to define physical resources for carrying information wirelessly between the access node 754 and UEs 752.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 752.

In addition, certain resource elements on the example air interface could be reserved for special purposes. For instance, on the downlink, certain resource elements could be reserved to carry synchronization signals that UEs 752 could detect as an indication of the presence of coverage and to establish frame timing, other resource elements could be reserved to carry a reference signal that UEs 752 could measure in order to determine coverage strength, and still other resource elements could be reserved to carry other control signaling such as PRB-scheduling directives and acknowledgement messaging from the access node 754 to served UEs 752. And on the uplink, certain resource elements could be reserved to carry random access signaling from UEs 752 to the access node 754, and other resource elements could be reserved to carry other control signaling such as PRB-scheduling requests and acknowledgement signaling from UEs 752 to the access node 754.

The access node 754, in some instances, may be split functionally into a radio unit (RU), a distributed unit (DU), and a central unit (CU) where each of the RU, DU, and CU have distinctive roles to play in the access network 756. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
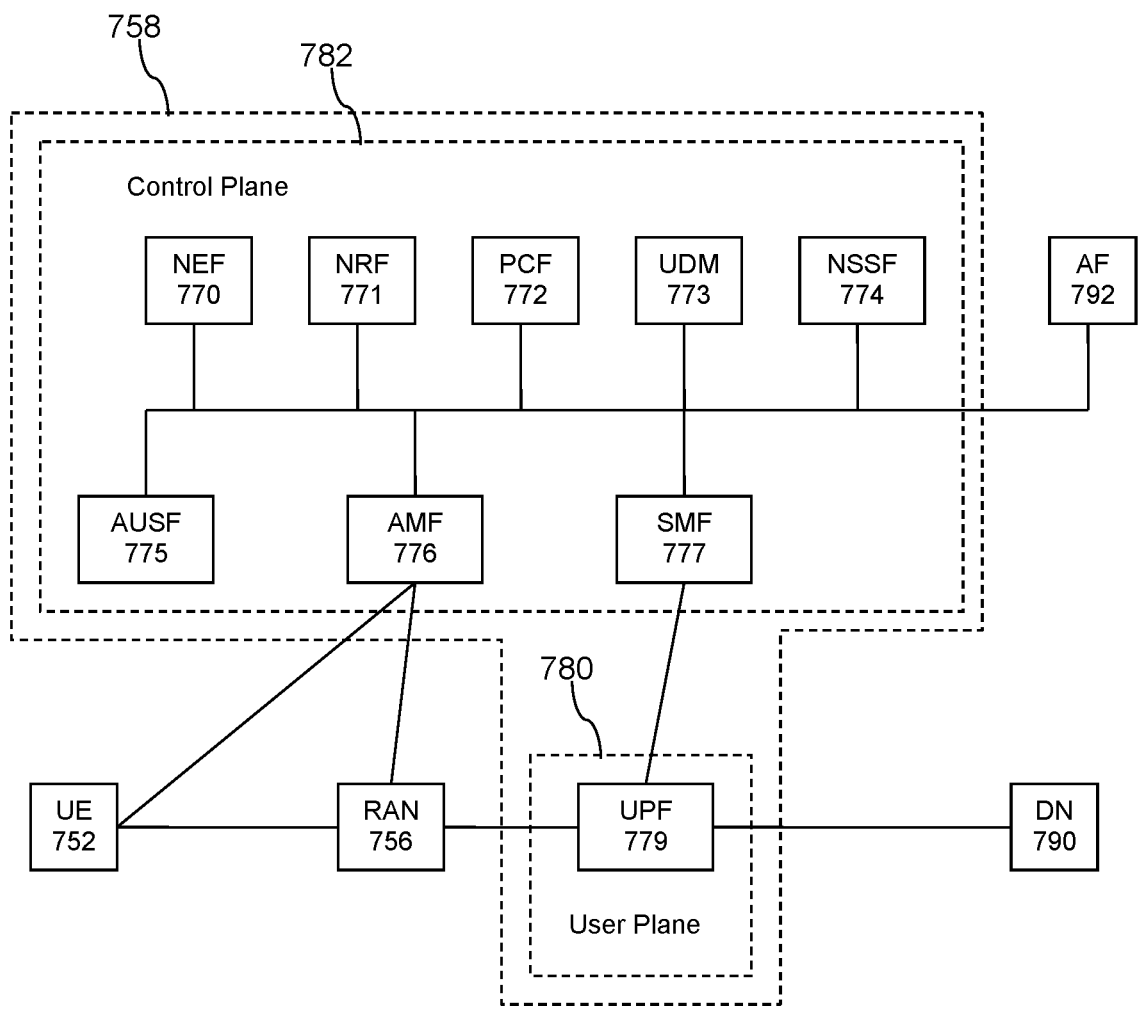

Turning now to FIG. 6B, further details of the core network 758 are described. In an embodiment, the core network 758 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 779, an authentication server function (AUSF) 775, an access and mobility management function (AMF) 776, a session management function (SMF) 777, a network exposure function (NEF) 770, a network repository function (NRF) 771, a policy control function (PCF) 772, a unified data management (UDM) 773, a network slice selection function (NSSF) 774, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 758 may be segregated into a user plane 780 and a control plane 782, thereby promoting independent scalability, evolution, and flexible deployment.

The UPF 779 delivers packet processing and links the UE 752, via the access network 756, to a data network 790 (e.g., the network 760 illustrated in FIG. 6A). The AMF 776 handles registration and connection management of non-access stratum (NAS) signaling with the UE 752. Said in other words, the AMF 776 manages UE registration and mobility issues. The AMF 776 manages reachability of the UEs 752 as well as various security issues. The SMF 777 handles session management issues. Specifically, the SMF 777 creates, updates, and removes (destroys) protocol data unit (PDU) sessions and manages the session context within the UPF 779. The SMF 777 decouples other control plane functions from user plane functions by performing dynamic host configuration protocol (DHCP) functions and IP address management functions. The AUSF 775 facilitates security processes.

The NEF 770 securely exposes the services and capabilities provided by network functions. The NRF 771 supports service registration by network functions and discovery of network functions by other network functions. The PCF 772 supports policy control decisions and flow based charging control. The UDM 773 manages network user data and can be paired with a user data repository (UDR) that stores user data such as customer profile information, customer authentication number, and encryption keys for the information. An application function 792, which may be located outside of the core network 758, exposes the application layer for interacting with the core network 758. In an embodiment, the application function 792 may be executed on an application server 779 located geographically proximate to the UE 752 in an "edge computing" deployment mode. The core network 758 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 774 can help the AMF 776 to select the network slice instance (NSI) for use with the UE 752.

Figure 7A:
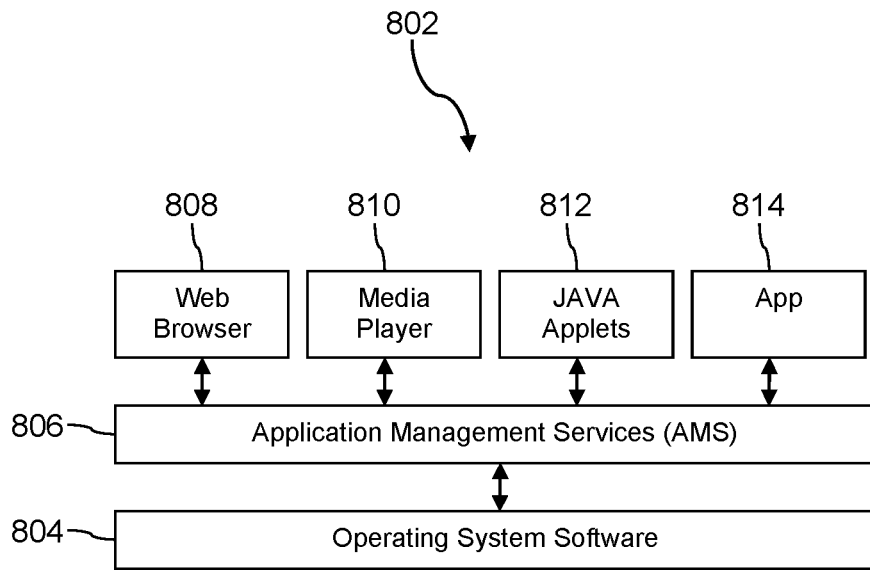
FIG. 7A is a block diagram of a software architecture according to an embodiment of the disclosure.

FIG. 7A illustrates a software environment 802 that may be implemented by the DSP 702. The DSP 702 executes operating system software 804 that provides a platform from which the rest of the software operates. The operating system software 804 may provide a variety of drivers for the handset hardware with standardized interfaces that are accessible to application software. The operating system software 804 may be coupled to and interact with application management services (AMS) 806 that transfer control between applications running on the UE 400. Also shown in FIG. 7A are a web browser application 808, a media player application 810, and JAVA applets 812. The web browser application 808 may be executed by the UE 400 to browse content and/or the Internet, for example when the UE 400 is coupled to a network via a wireless link. The web browser application 808 may permit a user to enter information into forms and select links to retrieve and view web pages. The media player application 810 may be executed by the UE 400 to play audio or audiovisual media. The JAVA applets 812 may be executed by the UE 400 to provide a variety of functionality including games, utilities, and other functionality.

Figure 7B:
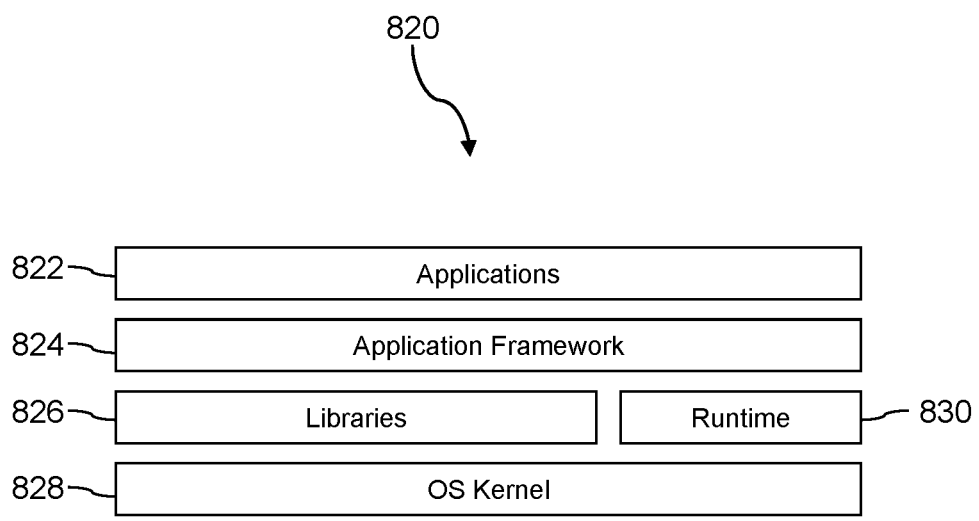
FIG. 7B is a block diagram of another software architecture according to an embodiment of the disclosure.

FIG. 7B illustrates an alternative software environment 820 that may be implemented by the DSP 702. The DSP 702 executes operating system kernel (OS kernel) 828 and an execution runtime 830. The DSP 702 executes applications 822 that may execute in the execution runtime 830 and may rely upon services provided by the application framework 824. Applications 822 and the application framework 824 may rely upon functionality provided via the libraries 826.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A wireless communication device comprising:
a non-transitory memory comprising a subset of a plurality of sign language data sets;
a processor; and
a local agent stored in the non-transitory memory that, when executed by the processor:
transmits context information associated with the wireless communication device to an AI engine on a computer system,
receives and stores the subset of the plurality of sign language data sets from the AI engine in the non-transitory memory of the wireless communication device, wherein the subset of the plurality of sign language data sets is selected based on the context information, and wherein the subset of the plurality of sign language data sets comprises a mapping of keys to sign language gestures,
receives content in need of language assistance,
determines whether to process the content locally or remotely based on at least one of network conditions or wireless communication device conditions,
in response to a determination to process the content locally, converts the content into a first set of sign language gestures based on the subset of the plurality of sign language data sets,
in response to a determination to process the content remotely:
sends at least some of the content to the AI engine,
receives a plurality of keys from the AI engine, and
determines a second set of sign language gestures based on the plurality of keys and the mapping included in the subset of the plurality of sign language data sets, and
sends the first set of sign language gestures or the second set of sign language gestures to a display of the wireless communication device, wherein the first set of sign language gestures or the second set of sign language gestures is presented on the display.

2. The wireless communication device of claim 1, wherein the local agent is further configured to send updated context information to the AI engine in response to the determination to process the content remotely, wherein the plurality of keys are based on the updated context information.

3. The wireless communication device of claim 1, wherein the local agent is further configured to:
transmit updated context information associated with the wireless communication device to the AI engine, and
receive and store a different subset of the plurality of sign language data sets from the AI engine in the non-transitory memory of the wireless communication device, wherein the different subset of the plurality of sign language data sets is selected based on the updated context information.

4. The wireless communication device of claim 3, wherein the local agent is further configured to:
receive second content in need of language assistance,
determine to process the second content locally based on at least one of network conditions or wireless communication device conditions,
convert the second content into a third set of sign language gestures based on the different subset of the plurality of sign language data sets, and
send the third set of sign language gestures to the display of the wireless communication device, wherein the third set of sign language gestures is presented on the display.

5. The wireless communication device of claim 1, wherein the first set of sign language gestures and the second set of sign language gestures are the same.

6. The wireless communication device of claim 1, wherein the context information comprises one or more of sensor information, a location of the wireless communication device, a time, or a schedule associated with the wireless communication device.

7. The wireless communication device of claim 1, wherein the first set of sign language gestures and the second set of sign language gestures comprise American Sign Language (ASL).

8. A method for delivery of artificial intelligence (AI) based context-sensitive language assistance, comprising:
    transmitting, by a local agent on a wireless communication device, context information associated with the wireless communication device to an AI engine on a computer system;
    receiving and storing, by the local agent, a subset of a plurality of sign language data sets from the AI engine in a non-transitory memory of the wireless communication device, wherein the subset of the plurality of sign language data sets is selected based on the context information;
    receiving, by the local agent, first content in need of language assistance;
    converting, by the local agent, the first content into a first set of sign language gestures based on the subset of the plurality of sign language data sets;
    displaying the first set of sign language gestures via a display of the wireless communication device;
    transmitting, by the local agent, updated context information associated with the wireless communication device to the AI engine;
    receiving and storing, by the local agent, a different subset of the plurality of sign language sets from the AI engine in the non-transitory memory, wherein the different subset of the plurality of sign language data sets is selected based on the updated context information;
    receiving, by the local agent, second content in need of language assistance;
    converting, by the local agent, the second content into a second set of sign language gestures based on the different subset of the plurality of sign language data sets; and
    displaying the second set of sign language gestures via the display of the wireless communication device.

9. The method of claim 8, further comprising determining, by the local agent, to process the first content and the second content locally based on at least one of network conditions or wireless communication device conditions.

10. The method of claim 8, wherein the different subset of the plurality of sign language data sets comprises a mapping of keys to sign language gestures, and further comprising:
    receiving, by the local agent, third content in need of language assistance;
    determining, by the local agent, to process the third content remotely based on at least one of network conditions or wireless communication device conditions;
    sending, by the local agent, at least some of the third content to the AI engine;
    receiving, by the local agent, a plurality of keys from the AI engine;
    determining, by the local agent, a third set of sign language gestures based on the plurality of keys and the mapping included in the different subset of the plurality of sign language data sets; and
    displaying the third set of sign language gestures via the display of the wireless communication device.

11. The method of claim 10, further comprising in response to the determination to process the third content remotely, sending, by the local agent, additional context information to the AI engine, wherein the plurality of keys are based on the additional context information.

12. The method of claim 8, wherein the context information comprises one or more of sensor information, a location of the wireless communication device, a time, or a schedule associated with the wireless communication device.

13. The method of claim 8, wherein at least one of the first set of sign language gestures or the second set of sign language gestures comprise American Sign Language (ASL).

14. A system for delivery of artificial intelligence (AI) based context-sensitive language assistance, comprising:
    a computer system that comprises:
        a non-transitory memory;
        a processor; and
        an AI engine stored in the non-transitory memory that, when executed by the processor:
            receives context information from a wireless communication device,
            determines a subset of a plurality of sign language data sets based on the context information from the wireless communication device,
            sends the subset of the plurality of sign language data sets to the wireless communication device, wherein the subset of the plurality of sign language data sets comprises a mapping of keys to sign language gestures,
            receives content in need of language assistance from the wireless communication device,
            determines a plurality of keys based on the content and the context information, and
            sends the plurality of keys to the wireless communication device; and
    a local agent stored in a non-transitory memory of the wireless communication device that, when executed by a processor of the wireless communication device:
        receives and stores the subset of the plurality of sign language data sets from the AI engine in the non-transitory memory of the wireless communication device,
        receives the plurality of keys from the AI engine,
        determines a set of sign language gestures based on the plurality of keys and the mapping included in the subset of the plurality of sign language data sets, and
        sends the set of sign language gestures to the display of the wireless communication device for presentation to a user of the wireless communication device.

15. The system of claim 14, wherein the local engine sends the content to the AI engine in response to a determination that the content is to be processed remotely based on at least one of network conditions or wireless communication device conditions.

16. The system of claim 14, wherein the AI engine further:
    receives updated context information from the wireless communication device,
    determines a different subset of a plurality of sign language data sets based on the updated context information from the wireless communication device, and
    sends the different subset of the plurality of sign language data sets to the wireless communication device.

17. The system of claim 16, wherein the local agent further:
    deletes the subset of the plurality of sign language data sets from the non-transitory memory of the wireless communication device, receives and stores the different subset of the plurality of sign language data sets from the AI engine in the non-transitory memory of the wireless communication device, receives second content in need of language assistance, determines that the second content is to be processed locally based on at least one of network conditions or wireless communication device conditions, converts the second content into a second set of sign language gestures based on the different subset of the plurality of sign language data sets, and sends the second set of sign language gestures to the display of the wireless communication device for presentation to the user of the wireless communication device.

18. The system of claim 14, wherein the AI engine uses mobile edge computing to determine and send the subset of the plurality of sign language data sets to the wireless communication device.

19. The system of claim 14, wherein the context information comprises one or more of sensor information, a location of the wireless communication device, a time, or a schedule associated with the wireless communication device.

20. The system of claim 14, wherein the AI engine applies or more machine learning models to determine the subset of the plurality of sign language data sets.

* * * * *